US009267024B2

(12) United States Patent
Oh et al.

(10) Patent No.: US 9,267,024 B2
(45) Date of Patent: Feb. 23, 2016

(54) POLYOLEFIN-BASED THERMOPLASTIC ELASTOMER COMPOSITE AND COVER MATERIAL FOR AN AIR BAG USING SAME, AND AIR BAG MODULE USING THE COVER MATERIAL

(75) Inventors: Woo-Jeong Oh, Seoul (KR); Yong Chun, Suwon-si (KR); Eung-Soo Kim, Daejeon (KR); Min Nam, Daejeon (KR); Hyeon-Don Kim, Yongin-si (KR); Gi-Dae Choi, Daejeon (KR)

(73) Assignees: LG CHEM, LTD., Seoul (KR); HYUNDAI MOBIS CO., LTD., Seoul (KR)

( * ) Notice: Subject to any disclaimer, the term of this patent is extended or adjusted under 35 U.S.C. 154(b) by 139 days.

(21) Appl. No.: 14/232,241

(22) PCT Filed: Jul. 11, 2012

(86) PCT No.: PCT/KR2012/005508
§ 371 (c)(1),
(2), (4) Date: Feb. 26, 2014

(87) PCT Pub. No.: WO2013/009096
PCT Pub. Date: Jan. 17, 2013

(65) Prior Publication Data
US 2014/0171548 A1 Jun. 19, 2014

(30) Foreign Application Priority Data

Jul. 11, 2011 (KR) .......................... 10-2011-0068454
Jul. 11, 2012 (KR) .......................... 10-2012-0075394

(51) Int. Cl.
*C08L 23/14* (2006.01)
*B60R 21/203* (2006.01)
*B60R 21/215* (2011.01)

(52) U.S. Cl.
CPC ............... *C08L 23/14* (2013.01); *B60R 21/203* (2013.01); *B60R 21/215* (2013.01); *C08L 23/142* (2013.01); *B60R 2021/21543* (2013.01); *C08L 2205/035* (2013.01)

(58) Field of Classification Search
CPC . C08L 23/14; C08L 2205/035; C08L 23/142; C08L 23/26; C08L 23/0876; C08L 25/08; C08L 23/02; C08L 51/06; C08L 53/00; B60R 21/203; B60R 21/215; B60R 2021/21543
See application file for complete search history.

(56) References Cited

U.S. PATENT DOCUMENTS

| 5,629,371 A * | 5/1997 | Kitagawa et al. ............ 524/505 |
| 2002/0193489 A1 | 12/2002 | Jung et al. |
| 2006/0020086 A1 | 1/2006 | Smith |

FOREIGN PATENT DOCUMENTS

| CN | 88101754 A | 12/1988 |
| JP | 2003-277635 A | 10/2003 |
| JP | 2010-053332 A | 3/2010 |
| KR | 10-2002-0072095 A | 9/2002 |
| KR | 10-2005-0109993 A | 11/2005 |
| KR | 10-2008-0005352 A | 1/2008 |
| KR | 10-0854322 B1 | 8/2008 |
| WO | 88/07564 A1 | 10/1988 |

OTHER PUBLICATIONS

European Search Report dated Mar. 11, 2015 of corresponding European Patent Application No. 12811781.9—6 pages.
Chinese Office Action dated May 19, 2015 of corresponding Chinese Patent Application No. 201280034276.0 and its English translation in 10 pages.
International Search Report dated Jan. 21, 2013 of PCT/KR2012/005508 which is the parent application—4 pages.

* cited by examiner

*Primary Examiner* — Nathan M Nutter
(74) *Attorney, Agent, or Firm* — Knobbe Martens Olson & Bear LLP

(57) ABSTRACT

The present invention relates to a polyolefin-based thermoplastic elastomer composition for a vehicle airbag cover, including a polypropylene-based resin, a denatured polypropylene resin, an ionomer resin, an olefin-based copolymer elastomer and a styrene-based copolymer elastomer, an airbag cover material using the composition, and an airbag module using the airbag cover material.

11 Claims, 3 Drawing Sheets

POLYOLEFIN-BASED THERMOPLASTIC ELASTOMER COMPOSITE AND COVER MATERIAL FOR AN AIR BAG USING SAME, AND AIR BAG MODULE USING THE COVER MATERIAL

TECHNICAL FIELD

The present invention relates to a polyolefin-based thermoplastic elastomer composition for a vehicle airbag cover, a cover material for an airbag using the composition, and an airbag module using the cover material.

BACKGROUND ART

Generally, vulcanized rubber is formed by vulcanizing a low-viscosity raw rubber material prepared by natural or artificial synthesis. Such a raw rubber material exhibits excellent flexibility and elasticity, but is problematic in that its forming process is very complicated, its stability is poor, and it is a thermosetting material, and thus it is difficult to reuse. Therefore, there has been a need to develop a novel material for solving the above problem. In accordance with the need, thermoplastic elastomer (TPE) was developed. Thermoplastic elastomers exhibit rubber elasticity under the condition of use, and serve as formable polymer materials under a forming condition. The polymer chain of a thermoplastic elastomer contains an elastic rubber phase (soft phase) and a hard phase preventing plastic deformation at room temperature, such as crystal, glass or the like. Various kinds of thermoplastic elastomers, such as urethane-based elastomer, olefin-based elastomer, amide-based elastomer including the first-developed styrene-based elastomer, have been developed. Such thermoplastic elastomers can be chiefly used in automobile components, electric household appliance components, shoe soles and the like. In the present invention, such a thermoplastic elastomer is used in a cover material for airbags.

An airbag cover must maintain a long-term ornamental appearance in a low-strength zone regardless of temperature change in a vehicle, must have a soft and flexible surface, and must retain sufficient mechanical properties which are not changed by shape, stress, cracking or the like.

Meanwhile, although the shape of an airbag cover is not particularly limited, the feel of the airbag cover to a passenger and the deployment characteristics of an airbag at the time of a collision with another vehicle may be changed according to the raw material of the airbag cover.

An airbag system operates as follows. An impact sensor detects a collision, and then an igniting agent in an expander is electrically or mechanically fired. Due to the firing, heat is generated, and this heat burns a gas generating agent to generate gas. This generated gas is accommodated in the cavity among a holder, an expander and cover, and is charged into an airbag to expand the airbag. Due to the pressure in the expanding airbag, the predetermined area of an airbag cover is broken and deployed to form an opening, and thus an airbag is instantaneously discharged and expanded toward the front of a passenger through the opening. The expanded airbag acts as an impact absorber, thus preventing a passenger from being injured by a collision. Therefore, an airbag cover is necessary for an airbag system, and is required to allow an airbag to be instantaneously discharged and expanded by accurately deploying the airbag without forming airbag cover fragments injuring a passenger when an airbag system operates and thus generates gas due to the occurrence of collision.

At the time of usage and operation of an airbag, the performance of an airbag cover is very important. Since an airbag cover may be actually subject to various temperature conditions, its performance must be guaranteed under extremely severe conditions. Thus, generally, when an airbag module is unfolded at a low temperature of −35° C., the predicted region of an airbag cover must be torn and opened, and the fragments of the airbag cover must not be shattered due to the breakage of the airbag cover. Further, when an airbag module is unfolded at a high temperature of +85° C., an airbag cover must not be deformed and stripped by heat.

When a vehicle operates in a normal state, an airbag cover serves to store an airbag cushion. When an airbag cover has enough impact strength to open an airbag module, an airbag cushion must be opened in 1/1000 of a second, and an airbag cover molded product designed for this purpose allows an airbag cushion to be normally unfolded. During the unfolding procedure, an airbag cover serves to unfold an airbag cushion, and other parts serve to hold an airbag cushion and other elements while being attached to a steering wheel.

The composition of such an airbag cover requires excellent impact strength at low temperature, and this performance is required at lower temperature.

Korean Patent Application Publication No. 10-2008-0005352 discloses a polyolefin composition for manufacturing a cover for mounting an airbag, wherein the composition is crosslinked by applying a crosslinking agent and a free radical initiator, thus improving the low-temperature shock resistance thereof.

In conventional technologies, organic peroxide, which is used as a crosslinking agent, acts on the chains of polypropylene and a polyolefin-based thermoplastic elastomer to form a network together with a free radial initiator and a co-crosslinking agent, thus obtaining a crosslinking effect. However, due to the form of organic peroxide, the chains of polypropylene and a polyolefin-based thermoplastic elastomer are cut irregularly to cause an undesired molecular weight reduction effect, thus deteriorating physical properties.

Further, in the network formed by a crosslinking agent, a free radical initiator and a co-crosslinking agent, there is a limitation in precisely controlling degree of crosslinkage to realize the physical properties of a resin composition, and there is a problem that a crosslinking agent and a free radical initiator remaining in the form of organic peroxide without participating on a crosslinking reaction deteriorates the thermal stability of a resin composition. Due to the deterioration of physical properties of the resin composition, the low-temperature impact resistance of an airbag cover deteriorates, so that, at the time of unfolding an airbag, the desired area of an airbag cover is not torn, and the undesired area thereof is torn because the air bag cover is separated in an unintentional direction.

Therefore, the present inventors have completed a composition having improved low-temperature impact strength, tensile strength and tensile elongation by partially crosslinking the composition without using a crosslinking agent, a co-crosslinking agent and a free radical initiator.

DISCLOSURE

Technical Problem

Accordingly, the present invention has been devised to solve the above-mentioned problems, and an object of the present invention is to provide a polyolefin-based thermoplastic elastomer composition having excellent low-temperature impact strength and tensile properties, the composition including a polypropylene-based resin, a denatured polypropylene resin, an ionomer resin, an olefin-based copolymer elastomer and a styrene-based copolymer elastomer.

Another object of the present invention is to provide an airbag cover material using the polyolefin-based thermoplastic elastomer composition.

Still another object of the present invention is to provide an airbag module using the airbag cover material.

Technical Solution

In order to accomplish the above objects, an aspect of the present invention provides a polyolefin-based thermoplastic elastomer composition including a polypropylene-based resin, a denatured propylene resin, an ionomer resin, an olefin-based copolymer elastomer and a styrene-based copolymer elastomer.

Another aspect of the present invention provides an airbag cover material using the polyolefin-based thermoplastic elastomer composition. Still another aspect of the present invention provides an airbag module using the airbag cover material.

Advantageous Effects

The polyolefin-based thermoplastic elastomer composition of the present invention is effective at improving low-temperature impact strength, tensile strength and tensile elongation because it includes an ionomer and is thus partially crosslinked without using a crosslinking agent, a co-crosslinking agent and a free radical initiator. Further, when the polyolefin-based thermoplastic elastomer composition is applied to an airbag cover material, the deployment characteristics, such as thermal aging deployment characteristics and thermal shock aging deployment characteristics, of the airbag cover material are excellent.

DESCRIPTION OF DRAWINGS

FIGS. 1A and 1B are schematic views showing a driver airbag module using the airbag cover material according to the present invention, wherein FIG. 1A is an exploded view of the driver airbag module and FIG. 1B is an assembly view of the driver airbag module.

BEST MODE

Figure 1A:
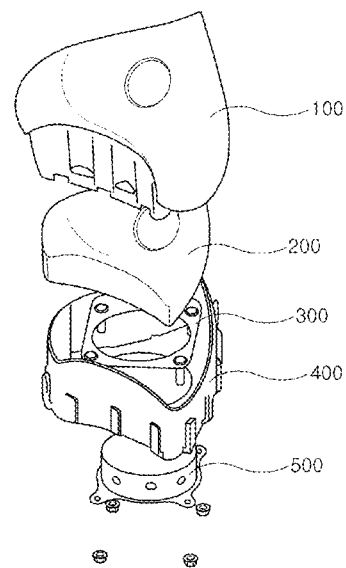

Hereinafter, the present invention will be described in detail.

The present invention provides a polyolefin-based thermoplastic elastomer composition, including: a polypropylene-based resin; a denatured polypropylene resin; an ionomer resin; an olefin-based copolymer elastomer; and a styrene-based copolymer elastomer. The composition may include, based on the total weight thereof: 20 to 60 wt % of the polypropylene-based resin; to 10 wt % of the denatured polypropylene resin; 5 to 30 wt % of the ionomer resin; 5 to 40 wt % of the olefin-based copolymer elastomer; and 5 to 40 wt % of the styrene-based copolymer elastomer.

The polypropylene-based resin may include a homopolymer and a copolymer, and may have a flow index of 1.0 to 90 g/10 min, preferably, 1.0 to 50 g/10 min at 230□ under a load of 2.16 kg. An α-olefin monomer constituting the polypropylene-based resin may be at least one selected from the group consisting of ethylene, 1-butene, 1-penetene and 1-hexane, but is not limited thereto.

In the present invention, the polypropylene-based resin may be included in order to maintain the shape and strength of an airbag cover, secure heat resistance, increase fluidity and improve dimensional stability. The polypropylene-based resin may be included in an amount of 20 to 60 wt %, preferably, 30 to 55 wt % based on the total weight of the composition. When the amount of the polypropylene-based resin is less than 20 wt %, the fluidity of the composition is lowered, and thus it is difficult to mold the composition, and, when the amount thereof is more than 60 wt %, the flexibility of the composition may be insufficient at low temperature.

The denatured polypropylene resin serves to improve the compatibility of the polypropylene-based resin with the ionomer resin. Specifically, the denatured polypropylene resin serves to improve the processibility and physical properties of the composition by preventing the phase separation between the polypropylene-based resin and the ionomer resin.

The denatured polypropylene resin may be configured such that the main chain or end of polypropylene is provided with at least one reaction group selected from the group consisting of acrylic acid, maleic acid, anhydrous maleic acid, carboxylic acid and a hydroxyl group. More preferably, the denatured polypropylene resin may be configured such that the end of polypropylene is provided with acrylic acid.

The denatured polypropylene resin may be included in an amount of 0.1 to 10 wt %, preferably 0.2 to 8 wt % and more preferably 0.5 to 5 wt %, based on the total weight of the composition. When the denatured polypropylene resin is included in the above range, the phase separation between the polypropylene-based resin and the ionomer resin does not occur, thus improving the processibility and physical properties of the composition.

The ionomer resin serves to improve impact strength. That is, the ionomer resin can partially crosslink the composition without a crosslinking agent, a co-crosslinking agent or a free radical initiator.

The ionomer resin may be configured such that the carboxylic acid of an ethylene acrylic acid copolymer, an ethylene methacrylic acid copolymer or an ethylene-acrylic acid-methacrylic acid ternary copolymer is partially substituted with a metal cation. In this case, the metal cation may be at least one cation selected from the group consisting of zinc, sodium, lithium, magnesium, calcium and potassium, but is not limited thereto.

The ionomer resin may be included in an amount of 5 to 30 wt %, preferably, 20 to 30 wt % based on the total weight of the composition.

The olefin-based copolymer elastomer serves to improve tensile elongation. The olefin-based copolymer elastomer may be an α-olefin-based copolymer, an olefin-based copolymer elastomer or a mixture thereof. The α-olefin-based copolymer or olefin-based copolymer elastomer may be a crystalline or amorphous random copolymer prepared by copolymerizing two or kinds of olefin monomers.

The olefin-based copolymer elastomer may be included in an amount of 5 to 40 wt %, preferably, 10 to 25 wt % based on the total weight of the composition, but is not limited thereto.

The styrene-based copolymer elastomer serves to improve low-temperature impact characteristics. For example, the styrene-based copolymer elastomer may be selected from the group consisting of a styrene-butadiene-styrene block copolymer, a styrene-ethylene-butylene-styrene block copolymer, a styrene-butadiene rubber block copolymer and a styrene-isoprene-styrene block copolymer, but is not limited thereto.

The styrene-based copolymer elastomer may be included in an amount of 5 to 40 wt %, preferably 7 to 35 wt % and more preferably 10 to 30 wt %, based on the total weight of the composition. When the amount of the styrene-based copolymer elastomer is less than 5 wt %, the low-temperature impact strength of the composition may be deteriorated, and, when the amount thereof is more than 40 wt %, the styrene-based copolymer elastomer is not sufficiently dispersed in the polypropylene-based resin, and thus the impact strength of the composition is not improved.

The sum of amounts of the denatured polypropylene resin, the olefin-based copolymer elastomer and the styrene-based copolymer elastomer may be 17 wt % or more, preferably 17 to 75 w %, and more preferably 20 to 60 wt %. When the sum of amounts of the denatured polypropylene resin, the olefin-based copolymer elastomer and the styrene-based copolymer elastomer is present in the above range, tensile strength and tensile elongation are increased, and low-temperature impact strength is improved, thus satisfying deployment performance.

Further, as long as the object and effect of the present invention are not damaged, the polyolefin-based thermoplastic elastomer composition may further include at least one additive selected from the group consisting of a lubricant, an antioxidant, a photostabilizer, a thermostabilizer, a release agent, a pigment, an antistatic agent, an antibacterial agent, a processing aid, a metal deactivator, an antifriction and antiwear agent, and a coupling agent, thereby imparting the composition with other physical properties.

The additive may be included in an amount of 0.1 to 10 wt %, preferably, 0.1 to 5 wt % based on the total weight of the composition.

Meanwhile, the present invention provides an airbag cover material, preferably a driver airbag (DAB) cover material using the above polyolefin-based thermoplastic elastomer composition.

Figure 1B:
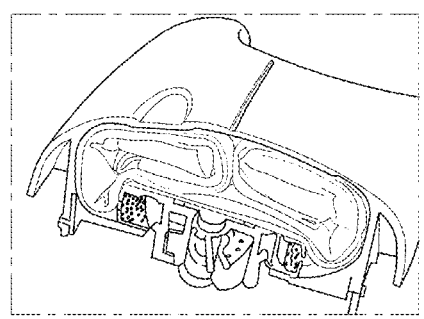

Further, the present invention provides a driver airbag module using the airbag cover material. FIG. 1 is a schematic view showing the driver airbag module according to the present invention. The driver airbag module of FIG. 1 may include a cover 100, a cushion assembly 200, a retainer ring assembly 300, a mounting plate 400 and an inflator assembly 500.

The composition of the present invention was primarily mixed with the additive in a mixer to form a mixture. Then, the mixture was melted and kneaded using one of a twin-screw extruder, a single-screw extruder, a roll mill, a kneader and a banbury mixer, and then pelletized to obtain pellets. Subsequently, the pellets were injection-molded to obtain a sample, and then the physical properties of the sample were measured.

The pellets obtained in this way was introduced into an injection molding machine for forming a DAB cover, and then injection-molded to form a DAB cover. As shown in FIG. 1, the deployment test of the airbag module including a cover 100, a cushion assembly 200, a retainer ring assembly 300, a mounting plate 400 and an inflator assembly 500 was carried out to evaluate the deployment performance of an airbag.

Figure 2:
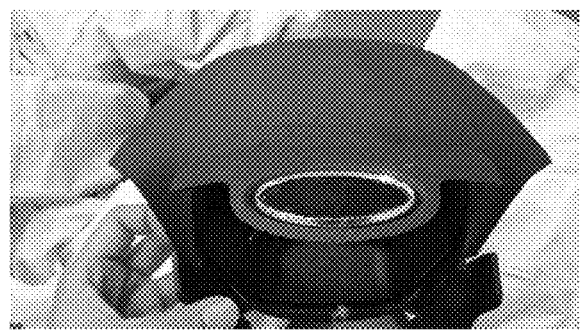
FIG. 2 is a photograph showing a normally-unfolded air bag module according to the present invention.
Figure 3:
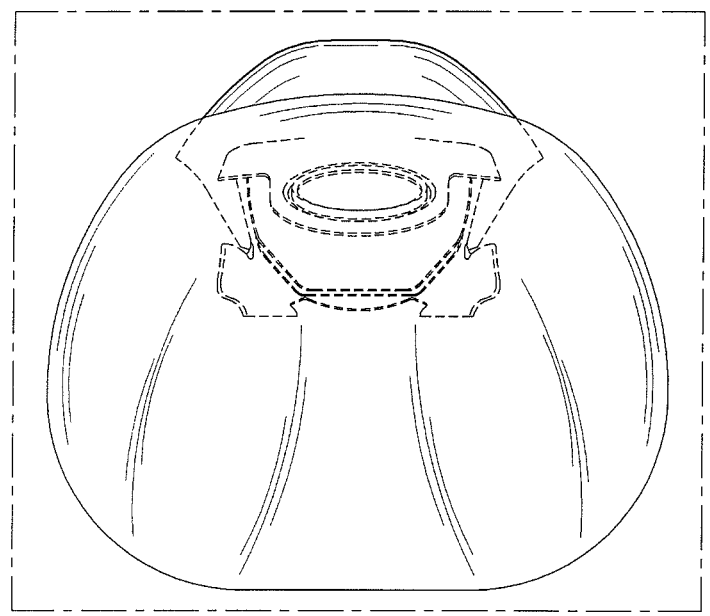
FIG. 3 is a schematic view showing a normally-unfolded air bag module according to the present invention.

FIG. 2 is a photograph showing a normally-unfolded air bag module according to the present invention.

When the polyolefin-based thermoplastic elastomer composition of the present invention is applied to an airbag cover material, the airbag cover material exhibited excellent deployment characteristics such as thermal aging deployment characteristics and thermal shock aging deployment characteristics without scattering the fragments of an airbag cover and separating a seam line.

MODE FOR INVENTION

Hereinafter, the present invention will be described in more detail with reference to the following Examples. However, these Examples are set forth to illustrate the present invention, and the scope of the present invention is not limited thereto.

EXAMPLES 1 TO 4 AND COMPARATIVE EXAMPLES 1 TO 7

Preparation of Olefin-Based Thermoplastic Elastomer Resins

Example 1

A composition including 40 wt % of an impact copolymer polypropylene resin (SEETEC M1600, manufactured by LG Chemical Co., Ltd.) having a melt index of 25 g/10 min as a polypropylene-based resin, 5 wt % of denatured polypropylene having a melt index of 20 g/10 min and containing 6 wt % of acrylic acid, 20 wt % of an ionomer resin (Surlyn 9910, manufactured by Dupont Corporation) having a melt index of 0.7 g/10 min and a density of 0.97 g/cm$^3$, 20 wt % of an ethylene-octene copolymer (LC170, manufactured by LG Chemical Co., Ltd.) having a melt index of 1.1 g/10 min and a density of 0.870 g/cm$^3$ as an olefin-based copolymer elastomer and 15 wt % of a styrene-ethylene-butadiene-styrene copolymer (Kraton G1657, manufactured by Kraton Polymer Corporation) having a melt index of 5 g/10 min and a density of 0.89 g/cm$^3$ as a styrene-based copolymer elastomer, based on the total weight of the composition, were mixed by a mixer. Then, the mixture was melted and kneaded into pellets to prepare an olefin-based thermoplastic elastomer resin.

Example 2

As given in Table 1 below, an olefin-based thermoplastic elastomer resin was prepared in the same manner as in Example 1, except that 25 wt % of an ionomer resin and 20 wt % of a styrene-based copolymer elastomer were used based on the total weight of the composition.

Example 3

As given in Table 1 below, an olefin-based thermoplastic elastomer resin was prepared in the same manner as in Example 1, except that 50 wt % of a polypropylene-based resin, 25 wt % of an ionomer resin, 10 wt % of an olefin-based copolymer elastomer and 10 wt % of a styrene-based copolymer elastomer were used based on the total weight of the composition.

Example 4

As given in Table 1 below, an olefin-based thermoplastic elastomer resin was prepared in the same manner as in Example 1, except that 50 wt % of a polypropylene-based resin, 30 wt % of an ionomer resin, 5 wt % of an olefin-based copolymer elastomer and 10 wt % of a styrene-based copolymer elastomer were used based on the total weight of the composition.

Comparative Example 1

As given in Table 1 below, an olefin-based thermoplastic elastomer resin was prepared in the same manner as in Example 1, except that 50 wt % of a polypropylene-based resin, 25 wt % of an olefin-based copolymer elastomer and 20 wt % of a styrene-based copolymer elastomer were used without using an ionomer resin.

Comparative Example 2

As given in Table 1 below, an olefin-based thermoplastic elastomer resin was prepared in the same manner as in Example 1, except that 50 wt % of a polypropylene-based resin and 15 wt % of an olefin-based copolymer elastomer were used without using denatured polypropylene.

Comparative Example 3

As given in Table 1 below, an olefin-based thermoplastic elastomer resin was prepared in the same manner as in Example 1, except that 45 wt % of a polypropylene-based resin, 30 wt % of an ionomer resin and 20 wt % of a styrene-based copolymer elastomer were used without using an olefin-based copolymer elastomer.

Comparative Example 4

As given in Table 1 below, an olefin-based thermoplastic elastomer resin was prepared in the same manner as in Example 1, except that 45 wt % of a polypropylene-based resin and 30 wt % of an ionomer resin were used without using a styrene-based copolymer elastomer.

Comparative Example 5

As given in Table 1 below, an olefin-based thermoplastic elastomer resin was prepared in the same manner as in Example 1, except that 50 wt % of a polypropylene-based resin and 45 wt % of an ionomer resin were used without using a styrene-based copolymer elastomer and an olefin-based copolymer elastomer.

Comparative Example 6

As given in Table 1 below, an olefin-based thermoplastic elastomer resin was prepared in the same manner as in Example 1, except that 50 wt % of a polypropylene-based resin, 30 wt % of an ionomer resin and 20 wt % of an olefin-based copolymer elastomer were used without using a styrene-based copolymer elastomer and denatured polypropylene.

Comparative Example 7

As given in Table 1 below, an olefin-based thermoplastic elastomer resin was prepared in the same manner as in Example 1, except that 50 wt % of a polypropylene-based resin, 30 wt % of an ionomer resin and 20 wt % of a styrene-based copolymer elastomer were used without using an olefin-based copolymer elastomer and denatured polypropylene.

Test Example

In order to evaluate the physical properties of the olefin-based thermoplastic elastomer pellets prepared in Examples 1 to 4 and Comparative Examples 1 to 7, a test sample for measuring physical properties was fabricated using a injection molding machine, and the tensile strength, tensile elongation, strength and hardness of the test sample were evaluated according to the ASTM standard. The results thereof are given in Table 2 below.

(1) Tensile Strength and Elongation

The tensile strength and elongation of the test sample were measured according to ASTM D638 under the conditions of a test temperature of 23° C. and a crosshead speed of 200 mm/min.

(2) Izod Impact Strength

The izod impact strength of the test sample was measured according to ASTM D256 under the condition of a temperature of −40° C.

(3) Hardness

The hardness of the test sample was measured according to ASTM D2240. The unit of hardness is shore D scale.

(4) Deployment Test

The olefin-based thermoplastic elastomer pellets prepared in Examples 1 to 4 and Comparative Examples 1 to 7 were introduced into an injection molding machine for forming a DAB cover and then injection-molded to form a DAB cover. Then, an airbag module was fabricated using the DAB cover, and was then mounted on a steering wheel. Subsequently, electrical signals were applied to a detonator of an inflator to explode the inflator, and thus an expanding airbag cushion broke the DAB cover and came out of the DAB cover. In this case, whether the DAB cover was normally broken toward a seam line formed by grooving the DAB cover was observed, and whether fragments of the DAB cover were scattered or the assembled DAB cover was separated was observed and evaluated.

(5) Deployment Test After Thermal Aging

After an airbag module was aged at a temperature of 100 to 110° C. for 400 hours, the airbag module was deployed in the same manner as in (4), and then whether or not the airbag module was abnormal was observed.

(6) Deployment Test After Thermal Shock Aging

After an airbag module was repeatedly aged at −40° C. and 110° C. for 24 days, the airbag module was deployed in the same manner as in (4), and then whether or not the airbag module was abnormal was observed.

TABLE 1

| Class. | | Examples | | | | Comparative Examples | | | | | | |
|---|---|---|---|---|---|---|---|---|---|---|---|---|
| (unit: wt %) | | 1 | 2 | 3 | 4 | 1 | 2 | 3 | 4 | 5 | 6 | 7 |
| Composition | Polypropylene | 40 | 40 | 50 | 50 | 50 | 50 | 45 | 45 | 50 | 50 | 50 |
| | Denatured polypropylene | 5 | 5 | 5 | 5 | 5 | — | 5 | 5 | 5 | — | — |
| | Ionomer resin | 20 | 25 | 25 | 30 | — | 20 | 30 | 30 | 45 | 30 | 30 |
| | Olefin-based copolymer elastomer | 20 | 10 | 10 | 5 | 25 | 15 | — | 20 | — | 20 | — |
| | Styrene-based copolymer elastomer | 15 | 20 | 10 | 10 | 20 | 15 | 20 | — | — | — | 20 |

TABLE 2

|  |  | Examples | | | | Comparative Examples | | | | | | |
|---|---|---|---|---|---|---|---|---|---|---|---|---|
| Classification | | 1 | 2 | 3 | 4 | 1 | 2 | 3 | 4 | 5 | 6 | 7 |
| Physical properties | Tensile strength (kg/cm$^2$) | 165 | 170 | 180 | 160 | 150 | 140 | 130 | 140 | 210 | 200 | 190 |
| | Tensile elongation (%) | 720 | 680 | 610 | 600 | 450 | 350 | 250 | 300 | 110 | 90 | 80 |
| | Low-temperature impact strength (kg cm/cm) | No Break | No Break | No Break | No Break | No Break | 27.1 (Break) | 30.4 (Break) | 17.7 (Break) | 11.5 (Break) | 15.6 (Break) | 10.2 (Break) |
| | Hardness (shore D) | 47 | 48 | 48 | 48 | 44 | 47 | 46 | 45 | 52 | 51 | 50 |
| Deployment performance | Before aging — High-temperature deployment | Normal | Normal | Normal | Normal | Normal | Normal | Normal | Normal | Cover broken | Cover broken | Cover broken |
| | Before aging — Low-temperature deployment | Normal | Normal | Normal | Normal | Normal | Normal | Normal | Cover broken | Cover broken | Cover broken | Cover broken |
| | After thermal aging — High-temperature deployment | Normal | Normal | Normal | Normal | Normal | Normal | Cover broken | Normal | Cover broken | Cover broken | Cover broken |
| | After thermal aging — Low-temperature deployment | Normal | Normal | Normal | Normal | Cover broken | Cover broken | Normal | Cover broken | Cover broken | Cover broken | Cover broken |
| | After thermal shock aging — High-temperature deployment | normal | Normal | Normal | Normal | Normal | Normal | Cover broken | Normal | Cover broken | Cover broken | Cover broken |
| | After thermal shock aging — Low-temperature deployment | normal | Normal | Normal | Normal | Cover broken | Cover broken | Normal | Cover broken | Cover broken | Cover broken | Cover broken |

As given in Table 2 above, in the case of the polyolefin-based thermoplastic elastomers of Examples 1 to 4, their respective test samples were not broken (No Break) at the time of measuring low-temperature impact strength, and exhibited high tensile strength and tensile elongation. In contrast, in the case of the polyolefin-based thermoplastic elastomer of Comparative Example 1 containing no ionomer resin, its test sample was not broken, but exhibited low tensile strength and tensile elongation. Further, in the case of the polyolefin-based thermoplastic elastomer of Comparative Example 2 containing no denatured polypropylene, its low-temperature impact strength was low. Further, in the case of the polyolefin-based thermoplastic elastomer of Comparative Example 3 containing no olefin-based copolymer elastomer, its tensile elongation was low. Further, in the case of the polyolefin-based thermoplastic elastomer of Comparative Example 4 containing no styrene-based copolymer, its low-temperature impact strength was low. Further, in the cases of the polyolefin-based thermoplastic elastomer of Comparative Example 5 containing no styrene-based copolymer and olefin-based copolymer, the polyolefin-based thermoplastic elastomer of Comparative Example 6 containing no denatured polypropylene and styrene-based copolymer elastomer and the polyolefin-based thermoplastic elastomer of Comparative Example 7 containing no denatured polypropylene and olefin-based copolymer elastomer, their tensile elongations and low-temperature impact strength were all low.

Meanwhile, in the deployment performance test, it was ascertained that the polyolefin-based thermoplastic elastomers of Examples 1 to 4 had excellent low-temperature impact strength, tensile strength and tensile elongation, and thus an airbag was normally deployed without scattering the fragments of an airbag cover and separating a seam line, and that the airbag was normally deployed even after thermal aging and thermal shock aging. However, in the case of the polyolefin-based thermoplastic elastomers of Comparative Examples 1 and 2, it was observed that an airbag cover was aged after thermal aging and thermal shock aging, so the low-temperature impact strength of the airbag cover was lowered, and thus the airbag cover was broken at low temperature. Further, in the case of the polyolefin-based thermoplastic elastomer of Comparative Example 3, it was observed that an airbag cover was aged after thermal aging and thermal shock aging, so the tensile elongation of the airbag cover was lowered, and thus the airbag cover was broken at high temperature. Further, in the case of the polyolefin-based thermoplastic elastomer of Comparative Example 4, it was observed that an airbag cover was aged after thermal aging and thermal shock aging, so the low-temperature impact strength of the airbag cover was lowered, and thus the airbag cover was broken at low temperature. Further, in the case of the polyolefin-based thermoplastic elastomers of Comparative Examples 5 to 7, it was observed that the low-temperature impact strength of the airbag cover was lowered, and thus the airbag cover was broken at low and high temperatures before thermal aging and thermal shock aging.

Consequently, it can be ascertained that the tensile strength and tensile elongation of the polyolefin-based thermoplastic elastomers of Examples 1 to 4 are excellent compared to those of the polyolefin-based thermoplastic elastomers of Comparative Examples 1 to 7, and the low-temperature impact strength thereof is improved, thus improving the deployment performance thereof.

The invention claimed is:

1. A polyolefin-based thermoplastic elastomer composition, comprising:
    a polypropylene-based resin;
    a denatured polypropylene resin;
    an ionomer resin;
    an olefin-based copolymer elastomer; and
    a styrene-based copolymer elastomer,
    wherein the composition does not comprise a cross-linking agent or free radical initiator for initiating cross-linking reactions among polymer elements, wherein the polypropylene-based resin is in an amount from 20 to 60 wt %, and the ionomer is in an amount from 20 to 30 wt % with reference to the total weight of the composition, wherein the denatured polypropylene resin is in an amount such that phase separation is inhibited between the polypropylene-based resin and the ionomer resin in a mixture of the composition and that cross-linking is formed by the ionomer resin in the mixture without a cross-linking reaction that uses a cross-linking agent or free radical initiator.

2. The polyolefin-based thermoplastic elastomer composition of claim 1, wherein the composition comprises, based on the total weight thereof:

0.1 to 10 wt % of the denatured polypropylene resin;
5 to 40 wt % of the olefin-based copolymer elastomer; and
5 to 40 wt % of the stryrene-based copolymer elastomer.

3. The polyolefin-based thermoplastic elastomer composition of claim 1, wherein the propylene-based resin has a flow index of 1.0 to 90 g/10 min at 230° C. under a load of 2.16 kg, and an α-olefin monomer constituting the polypropylene-based resin is at least one selected from the group consisting of ethylene, 1-butene, 1-penetene and 1-hexene.

4. The polyolefin-based thermoplastic elastomer composition of claim 1, wherein the denatured polypropylene resin is configured such that a main chain or an end of polypropylene is provided with at least one reaction group selected from the group consisting of acrylic acid, maleic acid, anhydrous maleic acid, carboxylic acid and a hydroxyl group.

5. The polyolefin-based thermoplastic elastomer composition of claim 1, wherein the ionomer resin is configured such that carboxylic acid of an ethylene acrylic acid copolymer, an ethylene methacrylic acid copolymer or an ethylene-acrylic acid-methacrylic acid ternary copolymer is partially substituted with a metal cation.

6. The polyolefin-based thermoplastic elastomer composition of claim 5, wherein the metal cation is at least one cation selected from the group consisting of zinc, sodium, lithium, magnesium, calcium and potassium.

7. The polyolefin-based thermoplastic elastomer composition of claim 1, wherein the olefin-based copolymer elastomer is an α-olefin-based copolymer, an olefin-based copolymer elastomer or a mixture thereof, which is a crystalline or amorphous random copolymer prepared by copolymerizing two or more olefin monomers.

8. The polyolefin-based thermoplastic elastomer composition of claim 1, wherein the styrene-based copolymer elastomer is at least one selected from the group consisting of a styrene-butadiene-styrene block copolymer, a styrene-ethylene-butylene-styrene block copolymer, a styrene-butadiene rubber block copolymer, and a styrene-isoprene-styrene block copolymer.

9. The polyolefin-based thermoplastic elastomer composition of claim 1, further comprising at least one additive selected from the group consisting of a lubricant, an antioxidant, a photostabilizer, a thermostabilizer, a release agent, a pigment, an antistatic agent, an antibacterial agent, a processing aid, a metal deactivator, an antifriction and antiwear agent, and a coupling agent.

10. An airbag cover material using the polyolefin-based thermoplastic elastomer composition of claim 1.

11. An airbag module using the airbag cover material of claim 10.

* * * * *